United States Patent
Sultana et al.

(10) Patent No.: US 8,995,715 B2
(45) Date of Patent: Mar. 31, 2015

(54) FACE OR OTHER OBJECT DETECTION INCLUDING TEMPLATE MATCHING

(75) Inventors: Bogdan Sultana, Bucharest (RO); Stefan Petrescu, Bucharest (RO); Radu Nicolau, Bucharest (RO); Vlad Ionut Ursachi, Bucharest (RO); Petronel Bigioi, Galway (IE); Corneliu Zaharia, Bucharest (RO); Peter Corcoran, Galway (IE); Szabolcs Fulop, Bucharest (RO); Mihnea Gangea, Bucharest (RO)

(73) Assignee: FotoNation Limited, Ballybrit, Galway (IE)

( * ) Notice: Subject to any disclaimer, the term of this patent is extended or adjusted under 35 U.S.C. 154(b) by 259 days.

(21) Appl. No.: 13/282,458

(22) Filed: Oct. 26, 2011

(65) Prior Publication Data

US 2012/0106790 A1    May 3, 2012

Related U.S. Application Data

(60) Provisional application No. 61/406,970, filed on Oct. 26, 2010.

(51) Int. Cl.
G06K 9/00 (2006.01)
G06K 9/46 (2006.01)
G06K 9/68 (2006.01)

(52) U.S. Cl.
CPC ........ *G06K 9/00973* (2013.01); *G06K 9/00228* (2013.01); *G06K 9/4661* (2013.01); *G06K 9/68* (2013.01)
USPC ........... 382/103; 382/190; 382/141; 382/147; 382/107

(58) Field of Classification Search
USPC ................... 382/103, 108, 190, 278
See application file for complete search history.

(56) References Cited

U.S. PATENT DOCUMENTS

| 5,283,443 | A | * | 2/1994 | Norton-Wayne et al. ................ 250/559.42 |
| 5,406,642 | A | * | 4/1995 | Maruya ................ 382/218 |
| 5,481,669 | A | | 1/1996 | Poulton et al. |
| 6,298,170 | B1 | * | 10/2001 | Morita et al. ............. 382/278 |

(Continued)

FOREIGN PATENT DOCUMENTS

| EP | 1205881 A2 | 5/2002 |
| EP | 1107177 B1 | 10/2009 |

(Continued)

OTHER PUBLICATIONS

PCT Notification of Transmittal of the International Search Report and the Written Opinion of the International Searching Authority, or the Declaration, for PCT Application No. PCT/IB2011/001942, report dated Apr. 18, 2012, 13 pages.

(Continued)

*Primary Examiner* — Chan Park
*Assistant Examiner* — Iman K Kholdebarin
(74) *Attorney, Agent, or Firm* — Hickman Palermo Becker Bingham LLP

(57) ABSTRACT

A template matching module is configured to program a processor to apply multiple differently-tuned object detection classifier sets in parallel to a digital image to determine one or more of an object type, configuration, orientation, pose or illumination condition, and to dynamically switch between object detection templates to match a determined object type, configuration, orientation, pose, blur, exposure and/or directional illumination condition.

19 Claims, 5 Drawing Sheets

(56) References Cited

U.S. PATENT DOCUMENTS

| | | | | |
|---|---|---|---|---|
| 6,655,585 B2* | 12/2003 | Shinn | | 235/382 |
| 6,873,743 B2 | 3/2005 | Steinberg | | |
| 7,016,881 B2* | 3/2006 | Li et al. | | 706/12 |
| 7,269,292 B2 | 9/2007 | Steinberg | | |
| 7,315,630 B2 | 1/2008 | Steinberg et al. | | |
| 7,315,631 B1 | 1/2008 | Corcoran et al. | | |
| 7,317,815 B2 | 1/2008 | Steinberg et al. | | |
| 7,324,671 B2* | 1/2008 | Li et al. | | 382/118 |
| 7,362,368 B2 | 4/2008 | Steinberg et al. | | |
| 7,403,643 B2 | 7/2008 | Ianculescu et al. | | |
| 7,440,593 B1 | 10/2008 | Steinberg et al. | | |
| 7,460,694 B2 | 12/2008 | Corcoran et al. | | |
| 7,460,695 B2 | 12/2008 | Steinberg et al. | | |
| 7,466,866 B2 | 12/2008 | Steinberg | | |
| 7,469,055 B2 | 12/2008 | Corcoran et al. | | |
| 7,469,071 B2 | 12/2008 | Drimbarean et al. | | |
| 7,471,846 B2 | 12/2008 | Steinberg et al. | | |
| 7,515,740 B2 | 4/2009 | Corcoran et al. | | |
| 7,551,754 B2 | 6/2009 | Steinberg et al. | | |
| 7,551,755 B1 | 6/2009 | Steinberg et al. | | |
| 7,555,148 B1 | 6/2009 | Steinberg et al. | | |
| 7,558,408 B1 | 7/2009 | Steinberg et al. | | |
| 7,564,994 B1 | 7/2009 | Steinberg et al. | | |
| 7,565,030 B2 | 7/2009 | Steinberg et al. | | |
| 7,574,016 B2 | 8/2009 | Steinberg et al. | | |
| 7,587,068 B1 | 9/2009 | Steinberg et al. | | |
| 7,606,417 B2 | 10/2009 | Steinberg et al. | | |
| 7,616,233 B2 | 11/2009 | Steinberg et al. | | |
| 7,620,218 B2 | 11/2009 | Steinberg et al. | | |
| 7,630,527 B2 | 12/2009 | Steinberg et al. | | |
| 7,634,109 B2 | 12/2009 | Steinberg et al. | | |
| 7,680,342 B2 | 3/2010 | Steinberg et al. | | |
| 7,684,630 B2 | 3/2010 | Steinberg | | |
| 7,692,696 B2 | 4/2010 | Steinberg et al. | | |
| 7,693,311 B2 | 4/2010 | Steinberg et al. | | |
| 7,702,136 B2 | 4/2010 | Steinberg et al. | | |
| 7,715,597 B2 | 5/2010 | Costache et al. | | |
| 7,783,082 B2* | 8/2010 | Koshizen et al. | | 382/118 |
| 7,792,335 B2 | 9/2010 | Steinberg et al. | | |
| 7,796,816 B2 | 9/2010 | Steinberg et al. | | |
| 7,796,822 B2 | 9/2010 | Steinberg et al. | | |
| 8,019,164 B2* | 9/2011 | Taguchi et al. | | 382/220 |
| 8,213,737 B2* | 7/2012 | Steinberg et al. | | 382/275 |
| 8,330,831 B2* | 12/2012 | Steinberg et al. | | 348/231.3 |
| 8,503,800 B2* | 8/2013 | Blonk et al. | | 382/226 |
| 8,593,542 B2* | 11/2013 | Steinberg et al. | | 348/239 |
| 8,611,644 B2* | 12/2013 | Fu et al. | | 382/159 |
| 8,648,959 B2* | 2/2014 | Capata et al. | | 348/345 |
| 2004/0017938 A1* | 1/2004 | Cooper et al. | | 382/171 |
| 2006/0120572 A1* | 6/2006 | Li et al. | | 382/118 |
| 2006/0140445 A1* | 6/2006 | Cusack, Jr. | | 382/103 |
| 2006/0140455 A1 | 6/2006 | Costache et al. | | |
| 2006/0204034 A1 | 9/2006 | Steinberg et al. | | |
| 2006/0228027 A1 | 10/2006 | Matsugu et al. | | |
| 2007/0013791 A1* | 1/2007 | Kinoshita et al. | | 348/239 |
| 2007/0022304 A1* | 1/2007 | Yanagawa | | 713/186 |
| 2007/0110305 A1 | 5/2007 | Corcoran et al. | | |
| 2007/0115357 A1* | 5/2007 | Stein et al. | | 348/148 |
| 2007/0160307 A1 | 7/2007 | Steinberg et al. | | |
| 2007/0201725 A1 | 8/2007 | Steinberg et al. | | |
| 2007/0269108 A1 | 11/2007 | Steinberg et al. | | |
| 2008/0013798 A1 | 1/2008 | Ionita et al. | | |
| 2008/0013799 A1 | 1/2008 | Steinberg et al. | | |
| 2008/0143854 A1 | 6/2008 | Steinberg et al. | | |
| 2008/0175481 A1 | 7/2008 | Petrescu et al. | | |
| 2008/0205712 A1 | 8/2008 | Ionita et al. | | |
| 2008/0219517 A1 | 9/2008 | Blonk et al. | | |
| 2008/0220750 A1 | 9/2008 | Steinberg et al. | | |
| 2008/0266419 A1 | 10/2008 | Drimbarean et al. | | |
| 2008/0267461 A1 | 10/2008 | Ianculescu et al. | | |
| 2008/0292193 A1 | 11/2008 | Bigioi et al. | | |
| 2008/0316327 A1* | 12/2008 | Steinberg et al. | | 348/222.1 |
| 2008/0316328 A1 | 12/2008 | Steinberg et al. | | |
| 2008/0317379 A1* | 12/2008 | Steinberg et al. | | 382/275 |
| 2009/0002514 A1 | 1/2009 | Steinberg et al. | | |
| 2009/0003661 A1 | 1/2009 | Ionita et al. | | |
| 2009/0003708 A1 | 1/2009 | Steinberg et al. | | |
| 2009/0040342 A1 | 2/2009 | Drimbarean et al. | | |
| 2009/0052749 A1 | 2/2009 | Steinberg et al. | | |
| 2009/0052750 A1 | 2/2009 | Steinberg et al. | | |
| 2009/0080713 A1 | 3/2009 | Bigioi et al. | | |
| 2009/0087042 A1 | 4/2009 | Steinberg et al. | | |
| 2009/0179998 A1 | 7/2009 | Steinberg et al. | | |
| 2009/0185753 A1 | 7/2009 | Albu et al. | | |
| 2009/0190803 A1 | 7/2009 | Neghina et al. | | |
| 2009/0196466 A1 | 8/2009 | Capata et al. | | |
| 2009/0208056 A1 | 8/2009 | Corcoran et al. | | |
| 2009/0238410 A1 | 9/2009 | Corcoran et al. | | |
| 2009/0238419 A1 | 9/2009 | Steinberg et al. | | |
| 2009/0244296 A1 | 10/2009 | Petrescu et al. | | |
| 2009/0245693 A1 | 10/2009 | Steinberg et al. | | |
| 2009/0263022 A1 | 10/2009 | Petrescu et al. | | |
| 2009/0273685 A1 | 11/2009 | Ciuc et al. | | |
| 2009/0290791 A1* | 11/2009 | Holub et al. | | 382/164 |
| 2009/0303342 A1 | 12/2009 | Corcoran et al. | | |
| 2010/0014721 A1 | 1/2010 | Steinberg et al. | | |
| 2010/0039525 A1 | 2/2010 | Steinberg et al. | | |
| 2010/0054533 A1 | 3/2010 | Steinberg et al. | | |
| 2010/0054549 A1 | 3/2010 | Steinberg et al. | | |
| 2010/0060727 A1 | 3/2010 | Steinberg et al. | | |
| 2010/0066822 A1 | 3/2010 | Steinberg et al. | | |
| 2010/0092039 A1 | 4/2010 | Steinberg et al. | | |
| 2010/0141786 A1 | 6/2010 | Bigioi et al. | | |
| 2010/0141787 A1 | 6/2010 | Bigioi et al. | | |
| 2010/0165140 A1 | 7/2010 | Steinberg | | |
| 2010/0165150 A1 | 7/2010 | Steinberg et al. | | |
| 2010/0182458 A1 | 7/2010 | Steinberg et al. | | |
| 2010/0188525 A1 | 7/2010 | Steinberg et al. | | |
| 2010/0188530 A1 | 7/2010 | Steinberg et al. | | |
| 2010/0202707 A1 | 8/2010 | Costache et al. | | |
| 2010/0220899 A1 | 9/2010 | Steinberg et al. | | |
| 2010/0329582 A1 | 12/2010 | Albu et al. | | |
| 2011/0007174 A1 | 1/2011 | Bacivarov et al. | | |
| 2011/0043648 A1 | 2/2011 | Albu et al. | | |
| 2011/0050919 A1 | 3/2011 | Albu et al. | | |
| 2011/0102553 A1 | 5/2011 | Corcoran et al. | | |
| 2011/0102643 A1 | 5/2011 | Nanu et al. | | |
| 2011/0115928 A1 | 5/2011 | Corcoran et al. | | |
| 2012/0008002 A1 | 1/2012 | Bigioi et al. | | |
| 2012/0020546 A1* | 1/2012 | Inoue et al. | | 382/145 |
| 2012/0106790 A1* | 5/2012 | Sultana et al. | | 382/103 |
| 2012/0200689 A1* | 8/2012 | Friedman et al. | | 348/78 |
| 2012/0207358 A1* | 8/2012 | Blonk et al. | | 382/118 |
| 2012/0249725 A1* | 10/2012 | Corcoran et al. | | 348/36 |
| 2012/0281104 A1* | 11/2012 | Ohmiya et al. | | 348/208.6 |

FOREIGN PATENT DOCUMENTS

| | | | |
|---|---|---|---|
| WO | 2012/004672 A2 | 1/2012 | |
| WO | 2012/004672 A3 | 6/2012 | |
| WO | 2012/004672 A9 | 4/2013 | |

OTHER PUBLICATIONS

Alexandro M. S. Adário, Eduardo L Roehe, Sergio Bampi: "Dynamically Reconfigurable Architecture for Image Processor Applications." In: Proceedings of the 36th Design Automation Conference, 1999 [online]. Retrieved on Apr. 2, 2012. Retrieved from the Internet at URL:<http://www.cs.york.ac.uk/rts/docs/SIGDACompendium-1994-2004/papers/1999/dac99/pdffiles/35_3.pdf.

PCT Notification of Transmittal of Copies of International Preliminary Report on Patentability Chapter I of the Patent Cooperation Treaty, International Preliminary Report on Patentability Chapter I, for PCT Application No. PCT/IB2011/001942, report dated Feb. 26, 2013, 6 pages.

PCT Notification of Transmittal of the International Search Report and the Written Opinion of the International Searching Authority, or the Declaration, for PCT Application No. PCT/IB2011/001942, report dated Feb. 1, 2013, 11 pages.

Nao Iwata, Shingo Kagami, Koichi Hashimoto: "A Dynamically Reconfigurable Architecture Combining Pixel-Level SIMD and Operation-Pipeline Modes for High Frame Rate Visual Processing",

(56) References Cited

OTHER PUBLICATIONS

Field-Programmable Technology, 2007. ICFPT 2007. International Conference On, IEEE, Dec. 1, 2007, pp. 321-324, XP031208417.
Sudarsanam A, Barnes R, Carver J, Kallam R, Dasu A: "Dynamically reconfigurable systolic array accelerators: a case study with extended Kalman filter and discrete wavelet transform algorithms", IET Computers and Digital Techniques, vol. 4, No. 2, Mar. 4, 2010, pp. 126-142, XP006034806, DOI:http://dx.doi.org/10.1049/IET-CDT:20080139.
Gilles Sassatelli, Lionel Torres, Pascal Benoit, Thierry Gil, Camille Diou, Gaston Cambon, Jerome Galy: "Highly scalable dynamically reconfigurable systolic ring-architecture for DSP applications", Proceedings Design, Automation and Test in Europe, Mar. 4, 2002, pp. 553-558, XP002234644.
Sayfe Kiaei, Jaisimha K. Durgam: "VLSI Design of Dynamically Reconfigurable Array Processor-Drap", Acoustic, Speech and Signal Processing, ICASSP-89. Glasgow, May 23-26, 1989; New York, IEEE, US, vol. 4, May 23, 1989, pp. 2484-2488, XP000090119.
Zhang, H.; Prabhu, V.; George, V.; Wan, M.; Benes, M.; Abnous, A.; Rabaey, J.M.: "A 1-V heterogeneous reconfigurable DSP IC for wireless baseband digital signal processing", IEEE Journal of Solid-State Circuits, IEEE Service Center, Piscataway, NJ, USA, vol. 35, No. 11, Nov. 1, 2000, pp. 1697-1704, XP002413277, DOI:http://dx.doi.org/10.1109/4.881217.
Woods R.E, Gonzalez R. C.: "Real-Time Digital Image Enhancement", Proceedings of the IEEE, vol. 69, No. 5, May 1981, pp. 643-654, XP002690597.
PCT Notification of Transmittal of International Preliminary Report on Patentability Chapter I of the Patent Cooperation Treaty, International Preliminary Report on Patentability Chapter I, for PCT Application No. PCT/IB2011/001942, report dated Jan. 8, 2013, 7 pages.
Jerome Dubois, Dominique Ginhac, Michel Paindavoine, and Barthelemy Heyrman: "A 10 000 fps CMOS Sensor with Massively Parallel Image", Processing IEEE Journal of Solid-State Circuits; vol. 43, Issue: 3, 2008, 12 pages, Retrieved from http://citeseerx.ist.psu.edu/viewdoc/summary?doi=10.1.1.108.6369.
William H. Robinson; D. Scott Wills: "Design of an Integrated Focal Plane Architecture for Efficient Image Processing", In Proc. Int. Conf. on Parallel and Distributed Computing Systems (2002), pp. 128-135. Retrieved from http://citeseerx.ist.psu.edu/viewdoc/summary?doi=10.1.1.132.6728.
Jones, M and Viola, P., Fast multi-view face detection, Mitsubishi Electric Research Lab, 2003. http://www.merl.com/papers/docs/TR2003-96.pdf.
Paul Viola, Michael Jones, Robust Real-time Object Detection, Second International Workshop on Statistical and Computational Theories of Vision—Modeling, Learning, Computing, and Sampling, Vancouver, Canada, Jul. 13, 2001. 25 pages.

* cited by examiner

FACE OR OTHER OBJECT DETECTION INCLUDING TEMPLATE MATCHING

PRIORITY AND RELATED APPLICATIONS

This application claims priority to United States provisional patent application no. 61/406,970, filed Oct. 26, 2010. This application is also related to several patent applications by the same assignee, including U.S. patent application Ser. No. (USSN) 11/027,001, filed Dec. 29, 2004, published as 2006/0140455, and USSN 11/464,083, filed Aug. 11, 2006, and USSN 12/038,777, filed Feb 27, 2008, published as 2008/0219517, and USSN 61/362,247, filed Jul. 7, 2010, and USSN 12/820,002, USSN 12/820,034, and USSN 12/820,086, each filed Jun. 21, 2010, and USSN 12/203,807, filed Sep. 3, 2008, published as 2009/0003661, and 12/038,147, filed Feb. 27, 2008, published as 2008/0205712, and USSN 12/784,418, filed May 20, 2010, and USSN 12/824,204, filed Jun. 27, 2010, which are all hereby incorporated by reference.

BACKGROUND

1. Field of the Invention

The invention relates to face and other object detection and recognition, particularly using parallel template matching with different sets of classifiers trained for detecting different objects and/or faces and/or different configurations, orientations or image capture conditions of objects and/or faces in digital images.

2. Description of the Related Art

Viola-Jones proposes a classifier chain consisting of a series of sequential feature detectors. The classifier chain rejects image patterns that do not represent faces and accepts image patterns that do represent faces.

A problem in face or other object detection and recognition processes arises when different faces or other objects appear in a scene or configured, oriented and/or captured differently such that a distribution in a large area of face/object space makes correct classification difficult without resource or time-intensive analysis. Different faces or other objects, or faces or other objects with similar configuration, orientation or image capture conditions such as illumination tend to be clustered together, and correct clustering of images of the same person or object is difficult. It is desired to be able to detect and/recognize within digital images different faces and other objects, and same faces and objects having different configurations or orientations or captured under different image capture conditions, while also conserving temporal resources.

DETAILED DESCRIPTIONS OF THE EMBODIMENTS

Figure 1:
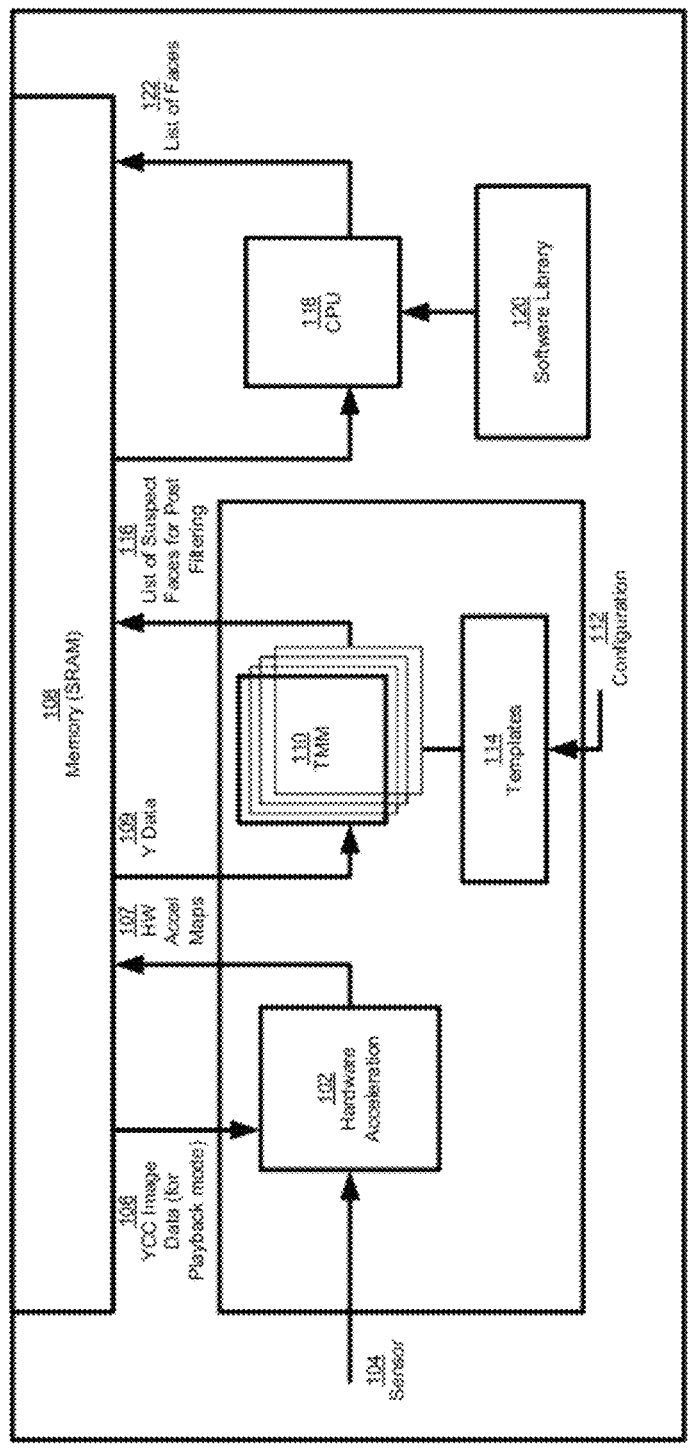
FIG. 1 schematically illustrates a hardware architecture including a template matching module in accordance with certain embodiments.

A digital image acquisition device is provided, including an optoelectonic system for acquiring a digital image, a processor, and a template matching module that is configured to program the processor to apply multiple differently-tuned object detection classifier sets in parallel to the digital image to determine one or more of an object type, configuration, orientation, pose or illumination condition, and to dynamically switch between object detection templates to match a determined object type, configuration, orientation, pose, blur, exposure or directional illumination condition, or combinations thereof.

One or more of the multiple differently-tuned object detection classifier sets may include a subset of a full classifier set including an initial 3-8 classifiers of said full set and/or classifier sets tuned to detect multiple different selected objects or to recognize faces of multiple different specific persons, or both.

The template matching module may comprise a dedicated hardware component.

The template matching module may be configured to program the processor to dynamically switch between templates based on a frame to frame analysis and/or selectively on a local scale.

The device may also include a hardware acceleration block configured to receive data acquired from the optoelectronic system and to provide one or more hardware acceleration maps to a memory. The template matching module may be further configured to retrieve luminance, grayscale and/or Y data from the memory.

The template matching module may be provided as part of a digital image acquisition device or of a system that also includes a hardware acceleration module as described in accordance with certain embodiments.

A method is provided for performing object detection in an acquired digital image. A digital image is acquired. Multiple differently-tuned object detection classifier sets are applied in parallel to the digital image to determine one or more of an object type, configuration, orientation, pose or illumination condition. The method includes dynamically switching between object detection templates to match a determined object type, configuration, orientation, pose, blur, exposure or directional illumination condition, or combinations thereof.

One or more of the multiple differently-tuned object detection classifier sets comprise a subset of a full classifier set including an initial 3-8 classifiers of said full set.

The multiple differently-tuned classifier sets may include classifier sets tuned to detect multiple different selected objects or to recognize faces of multiple different specific persons, or both.

The template matching module may comprise a dedicated hardware component.

The method may include dynamically switching between said templates based on a frame to frame analysis and/or selectively on a local scale.

The method may also include providing acquired image data and one or more hardware acceleration maps to a memory, and retrieving from the memory luminance, grayscale or Y data, or combinations thereof.

A template matching module is provided in accordance with certain embodiments for applying classifier sets in parallel and/or simultaneously to determine whether certain objects such as faces appear within a scene. The module may also be configured to determine whether a face or other object is configured or oriented in a particular way, such as facing at an angle to the camera or including more or less than an entire face, among other conditions, or may have been captured under certain conditions such as under directional illumination, or for example with blur or sub-optimal exposure, or bright or dark, among other conditions. In addition, the parallel template matching module may be provided as a dedicated hardware component.

For example, a classifier set may be provided that is trained to detect a human face uniformly illuminated and facing the camera, while further classifier sets may be trained to detect the first person's face looking or rotated in different directions or unevenly illuminated. Still others may be specifically trained to particularly detect a first person, a second person, a third person, etc. Still others may be trained to detect certain objects such as a cat, dog, car, house, mountain, avatar, etc. Each classifier set may be applied in parallel to the scene to determine if any face, any of the specific faces and/or any of the objects are present. The different configurations, orientations, characteristics or image capture conditions may include a directional illumination of the face region or object, an in-plane rotation of the face region or object, a 3D pose variation of the face region or object, a degree of smile, a degree of eye-blinking, a degree of eye-winking, a degree of mouth opening, facial blurring, eye-defect, facial shadowing, facial occlusion, facial color, or facial shape, or combinations of these or other characteristics. One or more tracking modules can be employed to follow in subsequent images any such faces or objects that are detected.

In an example method, a digital image is acquired including data corresponding to a face that appears to be illuminated unevenly. Multiple classifier sets are simultaneously applied to the face data, i.e., in parallel as part of the template matching module in accordance with multiple embodiments, including multiple uneven illumination classifier sets, and the face data is identified by one of the classifier sets as corresponding to a face that is illuminated from a particular direction. The uneven illumination condition of the face may be corrected based on the determining to thereby generate a corrected face image appearing to have more uniform illumination, or the unevenly illuminated face may be tracked, displayed, communicated, edited, stored or otherwise processed as-is.

A face or other object recognition program may be applied to the corrected face image. The detecting of the face and the determining of the uneven illumination condition of the face, or pose variation, etc., may be performed simultaneously, along with other object detection. A set of feature detector programs may be applied to reject non-face or other object data from being identified as face or other particular object data.

An illumination, orientation, pose or other condition may be determined for a face or other object based on acceptance of the face data by one of the classifier sets. The digital image may be one of multiple images in a series that include the face or other object. Two or more full classifier sets may be applied after determining that no single classifier set applies and that the face or other object data is not rejected as a face or other object.

Face or other object detection in accordance with certain embodiments may involve extracting a sub-window from an acquired digital image. Two or more shortened face or other object detection classifier cascades may be applied in parallel that are trained to be selectively sensitive to a characteristic of a face or other object region. A probability is determined that a face or other object with a certain form of the characteristic is present within the sub-window. An extended face or other object detection classifier cascade may be applied that is trained for sensitivity to the certain form of the characteristic. A final determination may be provided that a face, specific face, or specifically orientated, configured or illuminated face, or other object, exists within the image sub-window. The method may be performed in parallel and/or repeated one or more times for one or more further sub-windows from the image and/or one or more further characteristics.

A digital image acquisition device is also provided including an optoelectonic system for acquiring a digital image, a processor and a digital medium having stored therein processor-readable code for programming the processor to perform any of the face or other object detection methods described herein. A dedicated template matching hardware module is also provided for applying the classifier sets in parallel to an acquired digital image.

FIG. 1 schematically illustrates a hardware architecture including a template matching module in accordance with certain embodiments. The architecture of FIG. 1 includes a hardware acceleration block 102 that receives data acquired from a sensor 104 as well as YCC image data 106 (for playback mode. One or more hardware acceleration maps 107 is/are provided to memory 108, e.g., SRAM. Luminance or grayscale data or Y data 109 are retrieved from memory 108 by a template matching module (TMM) component 110. Different face and/or other object configurations 112 are trained and provided as classifier sets or templates 114 that are applied to the Y data 109 by the TMM 110. A list of suspected faces and/or other objects 116 are provided to memory 108 by the TMM 110. A processor or CPU 118 processes the list of suspected faces and/or other objects 116 referring to a software library 120. A list of faces and/or other objects 122 is provided to memory 108 by the processor 118.

Hardware acceleration provides a flexible engine that computes several maps that may be used by a template matching module in accordance with certain embodiments, e.g., for eye detect, blink detect, face detect at various poses, illumination conditions, orientations, etc., and face recognition, among other object detection classifier sets. A template matching module (TMM) 110 in accordance with certain embodiments may include a flexible engine that can be used for generic template matching purposes by reconfiguring internal templates. A TMM engine 110 can itself be placed in parallel with other dedicated hardware modules for speeding processing. As indicated, the TMM 110 itself may include more than one and even several or many various classifier sets that may be applied simultaneously or in parallel such that a face or other object of interest may be quickly spotted within an acquired digital image of a scene. In certain embodiments, only the first few classifiers (e.g., 3-7 or 8) are applied from each set in an initial phase. Those classifier sets of face configurations or conditions or other objects that are not yet rejected can then be applied with their extended classifier sets including the more complex classifiers that appear later in each series.

Figure 2:
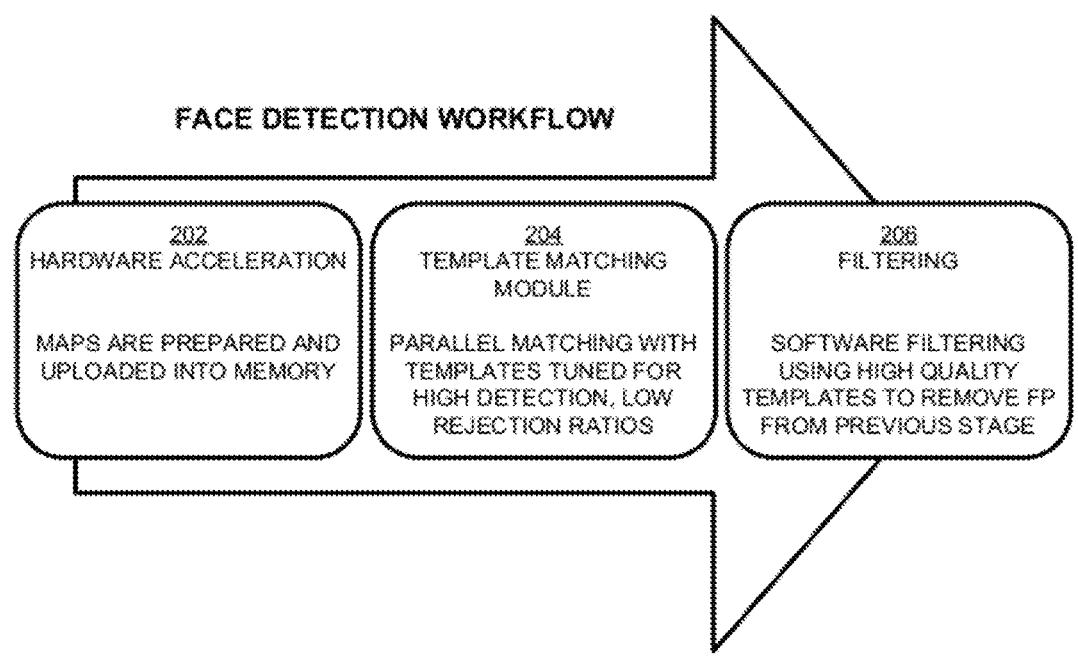
FIG. 2 schematically illustrates a face or other object detection workflow in accordance with certain embodiments.

FIG. 2 schematically illustrates a face or other object detection workflow in accordance with certain embodiments. Hardware acceleration 202 provides maps that are prepared and uploaded into memory. FIG. 1 also illustrates hardware acceleration component 102 providing maps 107 to memory 108. A template matching module 204 provides parallel matching with templates tuned for high detection, low rejection ratios or certain face and/or other object configurations. FIG. 1 illustrated TMM 110. A software filter 206 provides filtering using high quality templates to remove false positives from the previous stage. As described earlier, the TMM may use just the initial simpler classifier stages of multiple classifier sets in parallel providing quick face and/or other object detection even for faces that are not squarely facing the camera and/or that are not evenly illuminated, and even for objects such as pets, personal property, landscape features, etc. The faces or other objects efficiently detected by the TMM can then be filtered using a more extensive set of classifiers that can more effectively determine whether a face or other object detected by the TMM 204 actually corresponds to that face or other object or whether any of these are false positives.

Dynamic Template Switching

By dynamically changing templates, detection rates on illumination corner cases such as lowlight, backlight and overexposure may be improved, as well as for directional lighting influenced input images. Illumination information may be provided for face detection, e.g., by frame and face analysis from each frame, and keeping an analysis history over more frames. This information may be used to select different contrast enhance tables to adjust/enhance an input frame before applying template matching. By generating and applying different templates depending on which may provide a best performance based on illumination conditions, and switching them based on the same face and frame analysis that provide the illumination conditions, an advantageous solution is provided.

In addition to AHIP application (see below), a hybrid hardware/software solution may be advantageously applied. A hardware template matching engine may be combined with advanced software filtering and tracking components to do face (and other object) detection at high performance. Software may use output from a hardware template matching engine and its own advanced image analysis to select best templates and contrast enhance tables for particular lighting conditions. It can also dynamically change the template and contrast enhance table inside the hardware template matching module, thus yielding high performance for that lighting condition in terms of speed and/or quality from then on, e.g., on next video frames, and/or re-detection on a same static image.

In certain embodiments, only the contrast enhance tables may be changed or only the template may be changed or both or neither, i.e., depending on the conditions. The dynamic switching of templates may be applied in a hardware-only, a software-only and/or a hybrid solution.

Selective Local Scaling

Template switching may be provided on a local scale for selected input images. In Face Detection, when training a new classifier and when scanning an input image for faces, each training patch/scanning patch may be typically normalized by its squared variance. In order to reduce heap requirements for the templates used in hardware (see AHIP discussion below), in accordance with certain further embodiments, a new set of features may compose a classifier which use division instead of subtraction as the operator. Thus, the extra squared variance info may not be needed. This approach, however, can tend to be a better choice when not involving challenging (extreme) lighting conditions, such as lowlight, overexposure or backlight, as well as detection rate issues related to backlight and Afro-American test subjects. The dynamic template switching method based on the lighting info of an input image may be advantageously used under these conditions. The use of dedicated "specialized" templates for: lowlight, normal or overexposure lighting provides great advantages in accordance with these embodiments. Each of these templates may include an extra calibration of the "general" face-classifier, so the extra-footprint may be reduced. This approach works well to compensate to a certain degree for the lack of squared variance normalization specific to the low-heap templates.

In more difficult cases, such as input images containing both Caucasians and Afro-American test subjects, or input images with both backlight and normal illuminated faces, further embodiments are proposed. In the previous approach, compensation may be provided for the lack of normalization in a global manner, over the entire input image. In accordance with these further embodiments, e.g., where the global lighting info differs from the lighting info in certain local patches, then the template switching decision may be advantageously moved towards the local scale—deciding which "illumination template" (lowlight, normal or overexposed) to use for different scanning patches in an input image.

Each of these "specialized" templates has been trained in accordance with certain embodiments using specific lighting patches, so they are able to adapt to the new specific lighting face space with ease. This permits reduction of drawbacks related to the lack of squared variance illumination normalization specific to the low-heap-low-footprint hardware templates, by dynamically switching the templates on each 22×22 scanning patch. Four extra memory access counts may be provided per each scanning patch, when computing the mean gray value in the integral image. This value may be used to decide (comparing with an threshold) whether the patch's illumination is lowlight (eq: <40), normal or overexposed (eq: >180). This approach may increase the detection rate of the more difficult cases described above, without influencing any other performance measure, such as false positive rate. In addition, faster locking is achieved, as we can find faces on the current frame, and not wait one frame until the SW will switch the templates. Also, in static mode, a second pass is not needed to increase the detection rate on lowlight/backlight/African/overexposure cases.

AHIP (Advanced Hardware for Image Processing)

Figure 3:
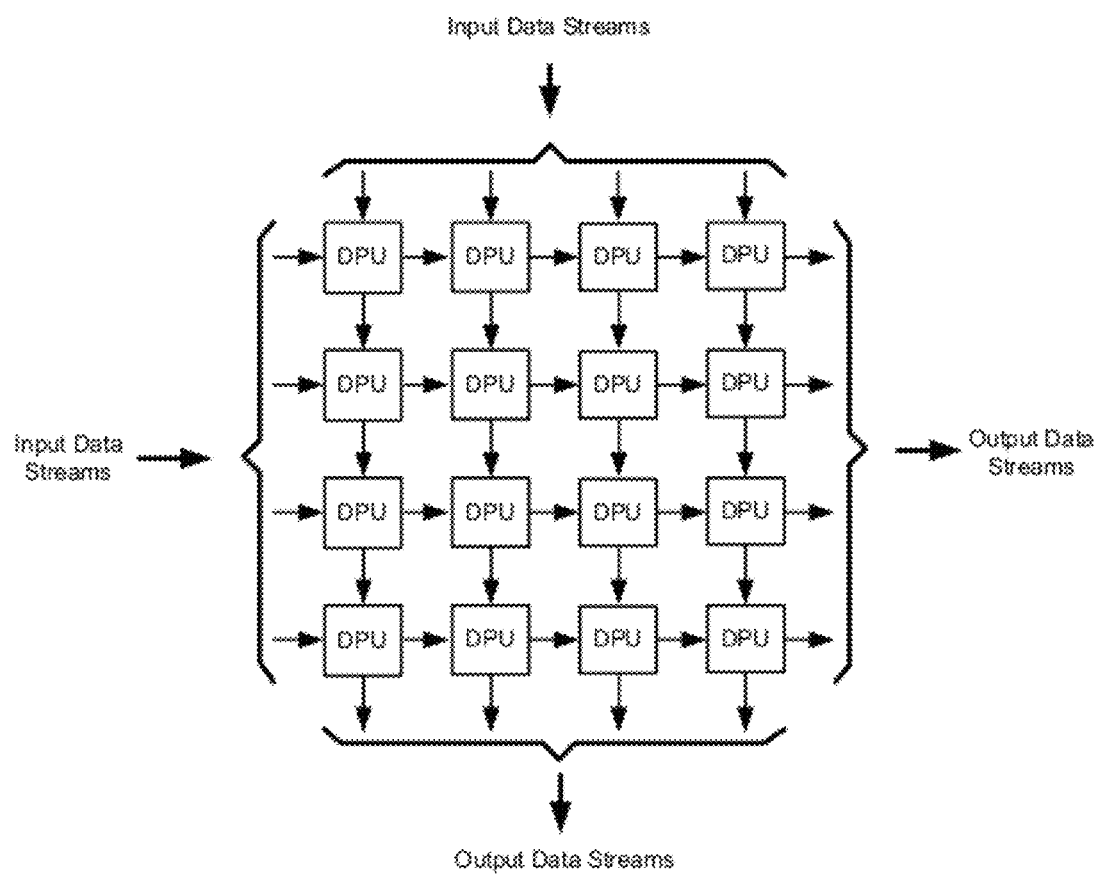
FIG. 3 illustrates a homogeneous systolic array architecture in accordance with certain embodiments.
Figure 4:
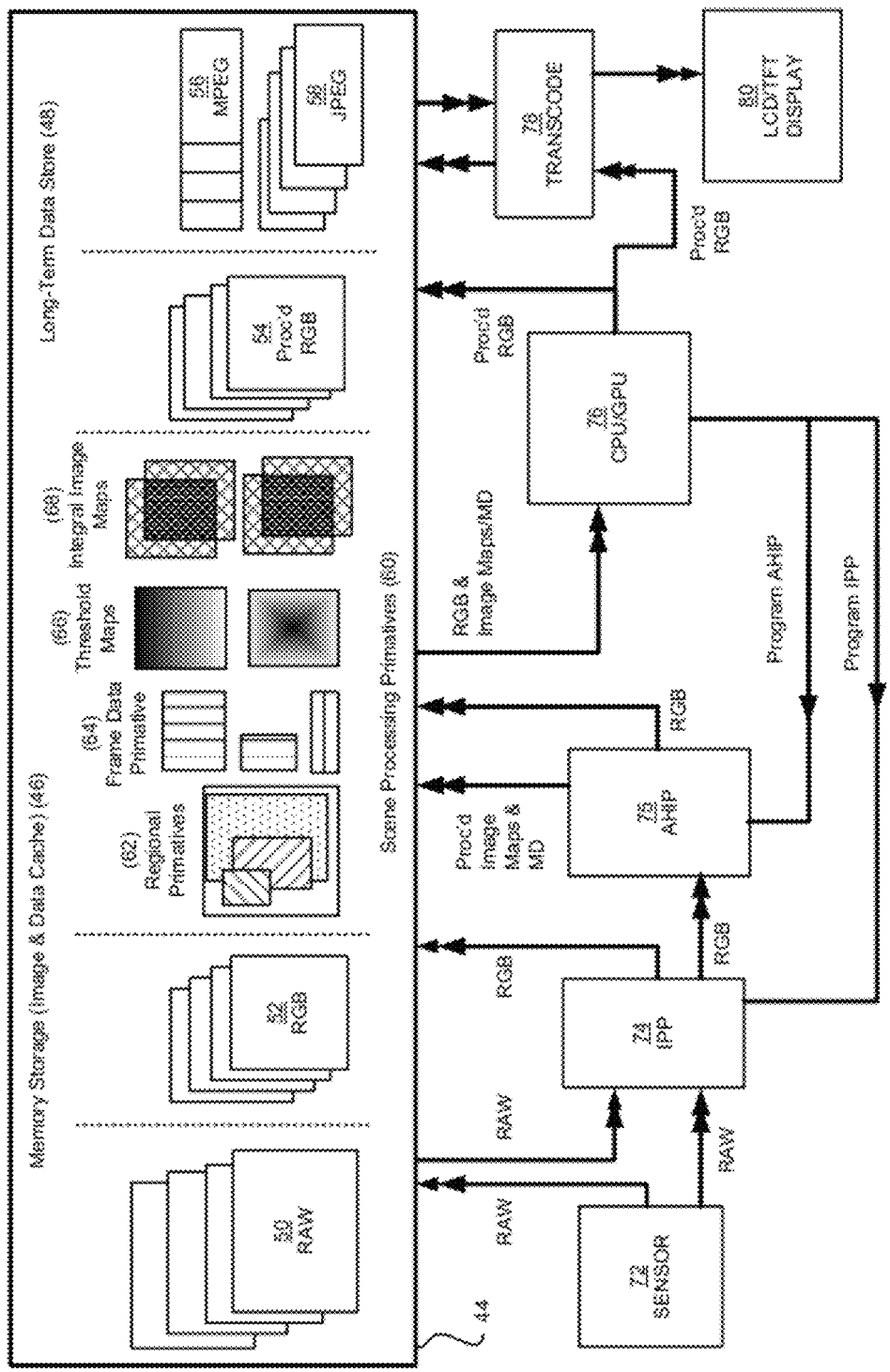
FIG. 4 illustrates IPP hardware with advanced hardware for image processing, or AHIP, including a pass-through characteristic, in accordance with certain embodiments.

Referring now to FIGS. 3 and 4 (see also U.S. Ser. No. 12/959,281, filed Dec. 2, 2010, and U.S. Ser. No. 61/362,247, entitled Real-Time Video Frame Pre-Processing Hardware, filed Jul. 7, 2010, which are hereby incorporated by reference), certain embodiments include a hardware sub-system which generates a range of image processing primitives derived in real-time from an image frame which is input serially, pixel-by-pixel with a delay which is significantly less than that associated with acquiring a full image frame. These primitives are available very soon or even almost immediately after an image frame has been acquired and can be used to further process this image frame when the next image frame is being acquired.

In addition, data determined from the processing of a previous image frame in a sequence can be made available for combination with image processing primitives derived from the present image frame. This enables detailed frame by frame scene processing without separately capturing a low-resolution preview stream of images (although such may be optionally utilized in certain embodiments).

Certain embodiments involve operation using a one pixel per clock cycle input and/or generation of a number of different types of image processing primitives which provide useful knowledge about the current image/video frame. Each primitive may be generated by a processing chain which includes one or more pixel processing blocks, or modules. These are linked together by a plurality of internal data busses which may be dynamically switched. In certain less complex embodiments modules may have directly linked data paths, although the primary input modules may share a common input data path from the image sensor/IPP. Multiple modules may share the same input data. Further, the output of individual processing blocks may be combined logically. The individual outputs from multiple processing chains are typically combined into a single data word before being output to external memory (SDRAM) as this facilitates optimal use of memory and external memory busses. Because of the differences in processing time between processing chains, a synchronization module is integrated with logical circuitry to ensure correct alignment of the output data.

The generated image primitives can advantageously be used to accelerate the performance of a range of image processing operations including red-eye detection, face detection and recognition, face beautification, frame-to-frame image registration, and multi-frame image joining for creation of panorama images, among many more applicable image processing techniques. Further, the availability of these primitives greatly simplifies the implementation of a range of scene analysis and processing algorithms. This can advantageously reduce, in particular, the tendency to read and write the full image frame from the memory store for subsequent processing on a CPU or GPU. In most cases the relevant image primative(s) and the main image are only read once in order to analyze and/or enhance the image with a particular algorithm. It is also possible to load primatives from multiple algorithms together with a single read of the main acquired image in order to execute these multiple algorithms on a single image read. This greatly reduces the memory bandwidth utilized to process a video stream. Where separate read/write buses are available, it is also possible to process one image frame on a main CPU/GPU while a second image frames is being acquired and pre-processed by IPP and AHIP modules.

Further, this system configuration enables data derived from the analysis of an image frame being processed by the CPU/GPU to be fed back to the IPP or the AHIP module to adapt the pre-processing of a following image frame. This detailed adaption of both the global image processing applied by the IPP and the scene-specific image processing applied by the AHIP enables faster and more responsive performance of a video acquisition appliance. This, in turn, allows faster adaptation of video acquisition in situations where lighting conditions are changing, e.g., based on an analysis of face regions and associated color maps of the skin. Such techniques are advantageously now applicable to video acquisition in accordance with certain embodiments.

In this regard, a frame counter and associated logic may also be utilized in certain embodiments. At the end of each frame processing cycle, it is possible to reconfigure internal pixel processing chains. This may involve loading new LUTs, changing the processing parameters of individual pixel processing blocks or in some cases reconfiguring the order or logical combination of blocks in a processing chain. In certain embodiments, modules are either selected or bypassed. In more sophisticated embodiments, data processing modules share an I/O port on one or more internal data-busses. In certain embodiments, double-buffered I/O may be employed to enable near simultaneous read/write operations to/from a module.

FIG. 3 illustrates a homogeneous systolic array architecture in accordance with certain embodiments. The systolic array paradigm, i.e., data-stream-driven by data counters, is the counterpart of the von Neumann paradigm, i.e., instruction-stream-driven by a program counter. Because a systolic array usually sends and receives multiple data streams, and multiple data counters are used to generate these data streams, it supports data parallelism. The name derives from analogy with the regular pumping of blood by the heart.

A systolic array is composed of matrix-like rows of data processing units called cells. Data processing units, or DPUs, are similar to central processing units (CPU)s, except for the lack of a program counter, since operation is transport-triggered, i.e., by the arrival of a data object. Each cell shares the information with its neighbours immediately after processing. The systolic array is often rectangular or otherwise has its cells arranged in columns and/or rows where data flows across the array between neighbour DPUs, often with different data flowing in different directions. FIG. 3 illustrates such an example of a homogeneous systolic array architecture. The data streams entering and leaving the ports of the array are generated by auto-sequencing memory units, or ASMs. Each ASM includes a data counter. In embedded systems, a data stream may also be input from and/or output to an external source.

Systolic arrays may include arrays of DPUs which are connected to a small number of nearest neighbour DPUs in a mesh-like topology. DPUs perform a sequence of operations on data that flows between them. Because traditional systolic array synthesis methods have been practiced by algebraic algorithms, only uniform arrays with only linear pipes can be obtained, so that the architectures are the same in all DPUs. A consequence is that only applications with regular data dependencies are generally implemented on classical systolic arrays.

Like SIMD (single instruction/multiple data) machines, clocked systolic arrays compute in "lock-step," with each processor undertaking alternate compute/communicate phases. However, systolic arrays with asynchronous handshaking between DPUs are often called wavefront arrays. One well-known systolic array is Carnegie Mellon University's iWarp processor, which has been manufactured by Intel. An iWarp system has a linear array processor connected by data buses going in both directions.

FIG. 4 illustrates IPP hardware with advanced hardware for image processing, or AHIP, including a pass-through characteristic, in accordance with certain embodiments. FIG. 4 schematically illustrates an embodiment that includes IPP hardware with AHIP (advanced hardware for image processing). The AHIP illustrated at FIG. 4 has a pass-through nature. FIG. 4 shows a memory store 44 including am image and data cache 46 and long-term data store 48. The cache 46 includes raw data 50, RGB data 52 and processed RGB data 54, and the long term data store may include MPEG images 56 and/or JPEG images 58. The embodiment illustrated at FIG. 4 also advantageously includes scene processing primitives 60 including e.g., regional primitives 62, frame data primitives 64, threshold maps 66 and/or integral image maps 68.

FIG. 4 also shows a sensor 72 that communicates raw data to the memory 44 and to an IPP 74. The IPP 74 also receives raw data from the memory 44. The IPP 74 provides RGB data 52 to the memory 44,46. RGB data is provided to an advantageous AHIP module 75 by the IPP 74. The AHIP module 75 provides processed image maps, AHIP module data and RGB data to the memory 44,46. The memory 44,46 provides RGB data, image maps and AHIP module data to the CPU/GPU 76. The CPU 76 provides processed RGB data 54 to the memory 44 and to a transcode module 78. The CPU 76 can also program the IPP module 74 and/or the AHIP module 75, as schematically illustrated at FIG. 4. The transcode module 78 provides data to and retrieves data from the memory 44,48. The transcode module 78 also provides data to be shown on, e.g., a LCD/TFT display 80.

Advantageously, in certain embodiments one standard image pixel may be taken per clock cycle and this pixel may be processed in one or more of a variety of ways. Several different types of output may be generated in parallel from the processing of each individual pixel. More than one instance of each output type can be provided by duplication of hardware elements. Because this hardware sub-system can process a pixel on every clock cycle, it does not delay the transfer of image pixels from the sensor and thus it can be inserted at any stage of the IPP.

A number of generic types of image processing primitives can be identified and are generated by the AHIP module. To clarify the following discussion, image data may be referred to as "pixels" (picture elements) and data values in an output primative may be referred to as "map-pixels". Typically a map-pixel will be significantly smaller than a pixel (24 or 32 bits). As examples, one form of map-pixel used for skin maps has only two-bits corresponding to 4 probabilities of the original pixel being a skin pixel. Another map-pixel has 4 bits corresponding to 16 thresholds describing how similar it is to a particular color in a predefined color space. The color-space thresholds corresponding to these 16 levels of similarity are stored in a LUT with the final output data primative map comprising map-pixels.

The first such primative includes a direct pixel to map-pixel mapping. In certain embodiments, this may include a color or luminance thresholding which determines how close a particular pixel is to a predetermined value in the color space. In certain embodiments, this data may be captured as a range of 15 thresholds and written into a 4-bit image map. These thresholds can be adjusted from image frame to image frame by the CPU/GPU.

In an exemplary embodiment, the data values of each threshold are set to measure how close image pixels are to a skin color. Such an image map can be advantageously used to differentiate different skin areas of a facial region and can be useful for applications such as face tracking and facial beautification.

This form of image primative only incurs a small fixed delay in terms of clock cycles. The output image map is typically available within a few tens of clock cycles after the last pixel of an image frames is input to the AHIP.

One variant on the pixel to map-pixel processing is when multiple pixels are processed, generating a single output pixel. This corresponds to a subsampling of the RAW input image. In some embodiments, a block of pixels is stored temporarily in hardware line buffers before being processed to generate the corresponding output primative data. In alternative embodiments, pixels continue to be processed individually but the outputs from processing each individual pixel are combined in some predetermined way to generate a single map-pixel.

A second form of primative is a kernel derived primative. The map-pixels for such primatives are derived from knowledge of the current image pixel and at least one previous pixel of the image. Many techniques specify N×N kernels, which implies that the output value corresponding to the current pixel is determined from N adjacent pixels in both horizontal and vertical directions within the image. As pixel data is typically only available to the AHIP module sequentially in certain embodiments, it will be clocked directly in those embodiments, row by row (and/or column by column), from the image sensor through the IPP. Full rows of image data would typically be buffered in these embodiments to support kernel derived primatives.

In certain embodiments, seven (7) rows of image data are stored in their entirety and an 8th image row is rolled over. This enables the module to generate image processing primatives derived from up to an 8×8 kernel. In this embodiment, there is a delay of the order of 8 times the row size of the image (8×1920 for 1080p) before a full kernel primative image map is available for the current image frame. Nevertheless this is still less than 1% of the total time taken to acquire the full image frame (1000 pixel rows) so that the image frame primative data is available very shortly after the final frame acquisition is completed.

One particular example of a kernel derived image processing primative is that of red-eye segmentation. In U.S. Pat. No. 6,873,743, for example, which is incorporated by reference, a technique for performing a 2×2 segmentation on an image is described. This operates on LAB color space. Another example of a kernel derived primative is the calculation of the integral image which is performed on the luminance component of an image. As will be explained shortly, the AHIP incorporates in certain embodiments a color-space transform module which enables on-the-fly conversion of input pixel data between several commonly used color spaces. Thus individual RGB pixel data can be converted to YCC or Lab color space with negligible delay within the AHIP.

A third form of primative includes frame derived primatives. These are examples of data primatives where a single pixel or a block of pixels do not generate a corresponding single map-pixel output. One example of this form of image processing primative is a histogram module which is preconfigured with a number of bins. Input pixel data is analyzed for a set of thresholds and classified into a histogram bin based on its value. At the end of an image frame each histogram bin contains a count of the number of pixels which satisfy its upper and lower threshold limits.

When combined with the example given for primative type one, it is possible to measure how many pixels in a particular image frame fell within a set of 16 skin-color histogram bins. This, in turn, may suggest that skin color thresholds need to be adjusted for the next image frame if, for example, too many, or too few, skin pixels were detected within a tracked face region. The hardware architecture within the AHIP is designed to enable processing blocks to be dynamically reconfigured prior to processing an image frame. Additional parallel processing blocks can be added to such a hardware architecture in accordance with certain embodiments.

In other embodiments, a color correlogram or other forms of histogram-like data may be determined by the AHIP. Such primatives may advantageously be determined from the same set of row buffers used to generate kernel data, the difference being that histogram or correlogram data provides frame derived primatives determined from multiple pixels rather than the one-to-one mapping of input to output pixels provided by kernel derived primatives.

Another form of frame derived primative includes one that performs a summation of pixel row and pixel column values. This enables a correlation of the current image frame with one or more previous image frames. Such primatives introduce another aspect of the AHIP where one or more of the primatives determined from the current frame may be remembered for one or more subsequent image frames. Such primative may be significantly smaller than the full image frame or the advantages of real-time processing will not be fully realized. In certain embodiments, a typical size limit for such primatives is that they are no larger than the maximum row size of the processed image.

In certain embodiments, such data may be retained within the AHIP module rather than being written to the external memory store. Thus image frame derived data and/or pixel derived data may be accumulated within the AHIP to facilitate faster processing of image frame primatives.

A fourth form of primative is derived from a specific spatial region of the main image frame. These primatives may be more complex in nature and may combine more complex hardware processing of a region with some base primatives and external data derived from the CPU/GPU and relating to one or more preceding image frames.

Hardware buffers may be used in processed that involve predicting locations of face regions in digital images (see, e.g., U.S. Pat. Nos. 7,315,631 and its progeny, and 7,466,866, e.g., incorporated by reference above). In certain embodiments, knowledge is gathered in one or more previous frames as to where one can expect a face to be detected within the current image frame. This approach has the advantage of being faster than performing face detection in the current frame, and the gathered information may be used for various purposes even before the current image frame.

In particular, it is generally difficult to determine a highly precise location of such a region during a first processing of an image frame because this depends on additional image processing to be performed in software on the GPU/CPU. As a consequence, it is generally only determined approximately where a spatial region is during a first hardware processing of an image frame by AHIP. However these approximate locations can be advantageously marked and are typically significantly smaller than the main image. In one embodiment, several such predicted regions may be stored within buffers of the AHIP for further processing on the next frame cycle. In an alternative embodiment, these are written to memory with the main image, but are loaded back through a second AHIP module configured especially to process such regions. In this second embodiment, advantage is taken of the fact that the memory subsystem is dual-ported. Thus when the next image frame is being processed by the primary AHIP and written to memory, the one or more predicted regions from the previous image frame may be read back to the second AHIP module for more specialized processing. In this embodiment, specific image regions would be processed typically only while the next image frame is being generically processed. Nevertheless a single frame delay can be easily compensated for and does not compromise the goal of achieving close to real-time processing of a video sequence.

One very common spatial region is a predicted face region. This is a region of the current image frame within which it is highly probably that a face region will be located. Such regions are frequently used in face tracking algorithms (again see U.S. Pat. No. 7,315,631 and its progeny, incorporated by reference above). One common use of such regions is to restrict the application of an image processing algorithm, such as red-eye detection, to an image region where there is high probability that a face will occur.

Figure 5:
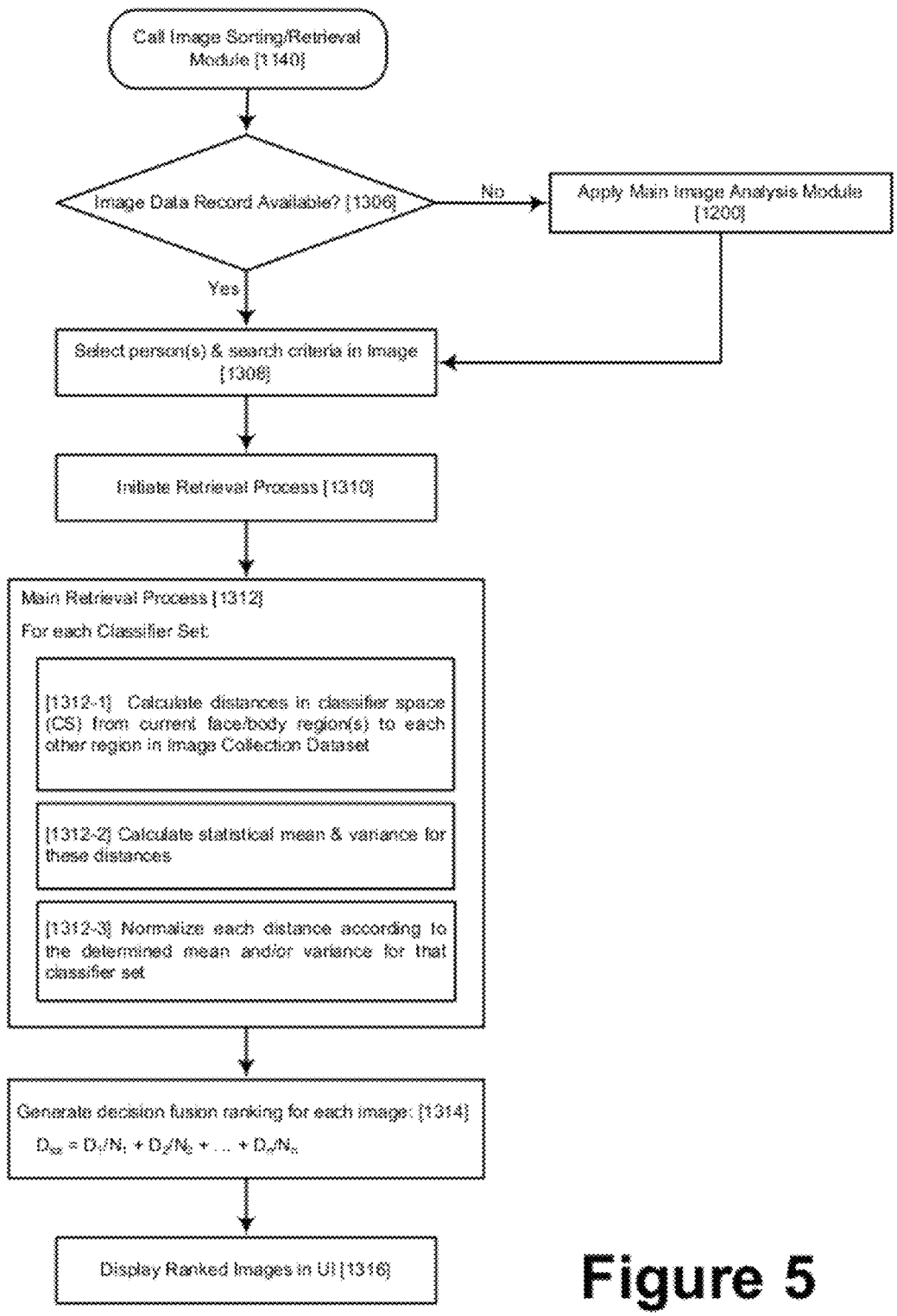
FIG. 5 illustrates a main image sorting/retrieval workflow in accordance with certain embodiments.

FIG. 5 illustrates a main image sorting/retrieval workflow in accordance with certain embodiments. Another embodiment is described in relation to FIG. 4. This takes the form of a set of software modules 1162 implemented on a desktop computer 1150. A second preferred embodiment provides an implementation within an embedded imaging appliance such as a digital camera.

In this embodiment, a program may be employed in a desktop computer environment and may either be run as a stand-alone program, or alternatively, may be integrated in existing applications or operating system (OS) system components to improve their functionality.

Image Analysis Module

Referring to illustrative examples provided at US published application 2008/0219517, incorporated by reference, an image analysis module may cycle through a set of one or more images and determine, extract, normalize and/or analyze face or other object regions and/or associated peripheral regions to determine feature vectors for a plurality of face and non-face classifiers. The module then records this extracted information in an image data set record. Components of this module are also used in both training and sorting/retrieval modes of the embodiment. The module is called from a higher level workflow and in its normal mode of usage is passed a set of images which are analyzed. The module loads/acquires the next image, if any, and detects any face or other object regions in the image. If no face or other object of interest regions were found, then flags in the image data record for that image are updated to indicate that no face regions were found. If the current image is not the last image in the image set being analyzed, upon image subsampling, face and peripheral region extraction, and region normalization, the next image may be loaded/acquired. If this was the last image, then the module will exit to a calling module. Where at least one face or other object of interest region is detected the module next extracts and normalizes each detected face region and, where possible, any associated peripheral regions.

Optional face region normalization techniques can range from a simple re-sizing of a face region to more sophisticated 2D rotational and affine transformation techniques and to highly sophisticated 3D face modeling methods.

Image Sorting/Retrieval Process

The workflow for an image sorting/retrieval processor module in accordance with certain embodiments is illustrated at FIG. 5 and is initiated from an image selection or acquisition process (see US 2006/0140455, incorporated by reference) as the final process step [1140]. When the image sorting/retrieval module is activated [1140], it will also be provided with at least two input parameters providing access to (i) the image to be used for determining the search/sort/classification criteria, and (ii) the image collection data set against which the search is to be performed. If a data record is determined to not be available [1306] and has not already been determined for the search image which proceeds to select persons and search criteria in the image [1308], then main image analysis module is next applied to it to generate this data record [1200]. The image may be next displayed to a user who may be provided options to make certain selections of face regions to be used for searching and/or also of the classifiers to be used in the search [1308]. Alternatively, the search criteria may be predetermined or otherwise automated through a configuration file and step [1308] may thus be automatic. User interface aspects are described in detail at US 2006/0140455.

After a reference region comprising the face and/or peripheral regions to be used in the retrieval process is selected (or determined automatically) the main retrieval process is initiated [1310], in the example workflow illustrated at FIG. 5, either by user interaction or automatically in the case where search criteria are determined automatically from a configuration file. An example main retrieval process is described in step [1312] and involves three main sub-processes which are iteratively performed for each classifier to be used in the sorting/retrieval process:

(i) Distances are calculated in the current classifier space between the feature vector for the reference region and corresponding feature vector(s) for the face/peripheral regions for all images in the image collection to be searched [1312-1]. In the preferred embodiment, the Euclidean distance is used to calculate these distances which serve as a measure of similarity between the reference region and face/peripheral regions in the image collection.

(ii) The statistical mean and standard deviation of the distribution of these calculated distances is determined and stored temporarily [1312-2].

(iii) The determined distances between the reference region and the face/peripheral regions in the image collection are next normalized [1312-3] using the mean and standard deviation determined in step [1312-2].

These normalized data sets may now be combined in a decision fusion process [1314] which generates a ranked output list of images. These may then be displayed by a UI module [1316].

An additional perspective on the process steps [1312-1, 1312-2 and 1312-3] is given in US 2006/0140455. A classifier space for a classifier may be such as the Wavelet/PCA face recognition described at US 2006/0140455. The basis vector set, [λ1, λ2, ..., λn] may be used to determine feature vectors for this classifier. The average or mean face may be calculated during the training phase and its vector position in classifier space is subtracted from the absolute position of all face regions. Thus, exemplary face regions have their positions in classifier space defined in vector terms relative to the mean face.

After a particular face region is selected by the user or by an automated process, the distances to all other face regions within a particular image collection are calculated. An analogous case arises when the distances in classifier space are measured in absolute terms from the origin, rather than being measured relative to the position of an averaged, or mean face. For example, the color correlogram technique as used in certain embodiments is a classifier of this type which does not have the equivalent of a mean face.

The distances from the feature vector for the reference region to the feature vectors for all other face regions may be calculated in a number of ways. In one embodiment, Euclidean distance is used, but other distance metrics may be advantageously employed for certain classifiers other than those described here.

Alternative Embodiments

A template matching module in accordance with certain embodiments applies classifier sets in parallel and/or simultaneously to determine whether certain objects such as faces appear within a scene. The module may also be configured to determine whether a face or other object is configured or oriented in a particular way, such as facing at an angle to the camera or including more or less than an entire face, among other conditions, or that may have been captured under certain conditions such as under directional illumination, or for example with blur or sub-optimal exposure, or bright or dark, among other conditions. The template matching module can check for any or all of these conditions or characteristics in parallel or simultaneously thereby preserving valuable temporal resources. In addition, the parallel template matching module may be provided as a dedicated hardware component of a camera-enabled device such as a mobile phone, DSC or video camera.

Face and/or other object detection particularly by training sets of classifiers have been widely researched and developed by the assignee of the present application, and alternative embodiments are provided are provided in earlier publications which are incorporated by reference, e.g., as described at U.S. Pat. Nos.: 7,362,368, 7,616,233, 7,315,630, 7,269,292, 7,471,846, 7,574,016, 7,440,593, 7,317,815, 7,551,755, 7,558,408, 7,587,068, 7,555,148, 7,564,994, 7,565,030, 7,715,597, 7,606,417, 7,692,696, 7,680,342, 7,792,335, 7,551,754, 7,315,631, 7,469,071, 7,403,643, 7,460,695, 7,630,527, 7,469,055, 7,460,694, 7,515,740, 7,466,866, 7,693,311, 7,702,136, 7,620,218, 7,634,109, 7,684,630, 7,796,816 and 7,796,822, and U.S. published patent applications nos.: US 20060204034, US 20070201725, US 20070110305, US 20090273685, US 20080175481, US 20070160307, US 20080292193, US 20070269108, US 20080013798, US 20080013799, US 20090080713, US 20090196466, US 20080143854, US 20080220750, US 20080219517, US 20080205712, US 20090185753, US 20080266419, US 20090263022, US 20090244296, US 20090003708, US 20080316328, US 20080267461, US 20100054549, US 20100054533, US 20090179998, US 20090052750, US 20090052749, US 20090087042, US 20090040342, US 20090002514, US 20090003661, US 20090208056, US 20090190803, US 20090245693, US 20090303342, US 20090238419, US 20090238410, US 20100014721, US 20100066822, US 20100039525, US 20100165150, US 20100060727, US 20100141787, US 20100141786, US 20100220899, US 20100092039, US 20100188530, US 20100188525, US 20100182458, US 20100165140 and US 20100202707, which are all incorporated by reference.

The invention is not limited to embodiments described above either expressly or as incorporated by reference, and other embodiments and features within the scope of the invention may be understood by those skilled in the art.

What is claimed is:

1. A digital image acquisition device, comprising:
   an optoelectronic system for acquiring a digital image;
   a processor;
   a plurality of object detection templates, wherein each object detection template of the plurality of object detection templates is:
      tuned for high detection, low rejection ratios, and
      trained to detect a corresponding object that has certain characteristics that are reflected in the template;
   a plurality of high-quality object detection templates tuned for low detection, high rejection ratios; and
   a template matching module configured to:
      apply the plurality of object detection templates in parallel to data of the digital image to determine one or more particular characteristics of either the digital image or an object in the digital image;
      wherein the one or more particular characteristics of the digital image comprise one or more of:
         an object type,
         a configuration,
         an orientation,
         a pose,
         a blur,
         an exposure, or
         an illumination condition;
      based on the one or more particular characteristics, select one or more high-quality object detection templates from the plurality of high-quality object detection templates;
      wherein the one or more high-quality object detection templates are different from the plurality of object detection templates;
   a filtering module configured to:
      use the one or more high-quality object detection templates to determine whether any of the one or more particular characteristics has been falsely identified; and
      filter out, from the one or more particular characteristics, any characteristics that were determined to have been falsely identified.

2. The device of claim 1, wherein one or more of the plurality of object detection templates comprise a subset of a full classifier set including an initial 3-8 classifiers.

3. The device of claim 1, wherein the plurality of object detection templates comprise one or more classifier sets tuned to detect multiple different selected objects or to recognize faces of multiple different specific persons, or both.

4. The device of claim 1, wherein the template matching module comprises a dedicated hardware component.

5. The device of claim 1, wherein the template matching module is configured to dynamically switch between the plurality of object detection templates based on a frame to frame analysis.

6. The device of claim 1, wherein the template matching module is configured to dynamically switch between the plurality of object detection templates selectively on a local scale.

7. The device of claim 1, further comprising a hardware acceleration block configured to receive additional data acquired from the optoelectronic system and to provide one or more hardware acceleration maps to a memory, and the template matching module is further configured to retrieve luminance values, grayscale values, or Y data, or combinations thereof, from the memory.

8. The device of claim 1, wherein at least one of the plurality object detection templates comprises a face detection classifier set.

9. An object detection system, comprising:
an optoelectronic system for acquiring a digital image;
a processor;
a plurality of object detection templates, wherein each object detection template of the plurality of object detection templates is:
tuned for high detection, low rejection ratios, and
trained to detect a corresponding object that has certain characteristics that are reflected in the template;
a plurality of high-quality object detection templates tuned for low detection, high rejection ratios;
a template matching module configured to:
apply the plurality of object detection templates in parallel to data of the digital image to determine one or more particular characteristics of either the digital image or an object in the digital image;
wherein the one or more particular characteristics of the digital image comprise one or more of:
an object type,
a configuration,
an orientation,
a pose,
a blur,
an exposure, or
an illumination condition;
based on the one or more particular characteristics, select one or more high-quality object detection templates from the plurality of high-quality object detection templates;
wherein the one or more high-quality object detection templates are different from the plurality of object detection templates; and
a filtering module configured to:
use the one or more high-quality object detection templates to determine whether any of the one or more particular characteristics has been falsely identified; and
filter out, from the one or more particular characteristics, any characteristics that were determined to have been falsely identified.

10. The system of claim 9, wherein at least one of the plurality of object detection templates comprises a face detection classifier set.

11. The system of claim 9, further comprising:
a hardware acceleration block configured to receive the digital image and to provide one or more hardware acceleration maps to a memory, from which the template matching module is further configured to retrieve luminance values, grayscale values or Y data, or combinations thereof.

12. A method of object detection in an acquired digital image, comprising:
acquiring a digital image;
applying a plurality of object detection templates in parallel to data of the digital image to identify one or more particular characteristics of either the digital image or an object in the digital image;
wherein each object detection template of the plurality of object detection templates is:
tuned for high detection, low rejection ratios, and
trained to detect a corresponding object that has certain characteristics that are reflected in the template;
wherein the one or more particular characteristics of the digital image comprise one or more of
an object type,
a configuration,
an orientation,
a pose,
a blur,
an exposure, or
an illumination condition;
based on the one or more particular characteristics, select one or more high-quality object detection templates from a plurality of high-quality object detection templates;
wherein the plurality of high-quality object detection templates are tuned for low detection, high rejection ratios;
wherein the one or more high-quality object detection templates are different from the plurality of object detection templates;
use the one or more high-quality object detection templates to determine whether any of the one or more particular characteristics has been falsely identified; and
filtering out, from the one or more particular characteristics, any characteristics that were determined to have been falsely identified; and
wherein the method is performed by one or more computing devices.

13. The method of claim 12, wherein one or more of the plurality object detection templates comprise a subset of a full classifier set including an initial 3-8 classifiers.

14. The method of claim 12, wherein the plurality object detection templates tuned to detect multiple different selected objects or to recognize faces of multiple different specific persons, or both.

15. The method of claim 12, wherein at least one of the plurality object detection templates comprises a face detection classifier set.

16. The method of claim 12, wherein the template matching module comprises a dedicated hardware component.

17. The method of claim 12, further comprising dynamically switching between the object detection templates based on a frame to frame analysis.

18. The method of claim 12, further comprising dynamically switching between the object detection templates selectively on a local scale.

19. The method of claim 12, further comprising providing the digital image and one or more hardware acceleration maps to a memory, and retrieving, from the memory, luminance values, grayscale values, or Y data, or combinations thereof.

* * * * *